Feb. 7, 1961 A. E. POWELL 2,971,171
MAGNETOSTRICTIVE DELAY LINE
Filed Jan. 9, 1957

INVENTOR.
ALBERT E POWELL
BY John P. Chandler
HIS ATTORNEY.

United States Patent Office 2,971,171
Patented Feb. 7, 1961

2,971,171
MAGNETOSTRICTIVE DELAY LINE

Albert E. Powell, Chatham, N.J., assignor, by mesne assignments, to Deltime, Inc., Mamaroneck, N.Y., a corporation of New York Filed Jan. 9, 1957, Ser. No. 633,221

1 Claim. (Cl. 333—30)

This invention relates to a magnetostrictive delay line constructed so that energy may be imparted to or derived from a magnetostrictive material without causing a primary reflection wave. It has special reference to the disposition of transmitting and receiving coils whereby the usual reflection of energy within the material is eliminated.

Magnetostrictive delay lines have been used in connection with radar equipment and other scientific apparatus to produce an easily controlled time delay between signals. For this purpose a transmitting coil is positioned around a length of material, usually nickel or a nickel alloy, and when a pulse of electric current passes through the coil a mechanical vibration is set up in the material which travels from the coil in both directions at the speed of sound in the material. A similar coil, placed a variable distance from the transmitting coil is adapted to receive the pulse sent out by the transmitter since a pulse is generated in the winding of a receiving coil when a sound wave passes through the nickel material in the center of the coil.

Prior delay lines have been complicated by the fact that sound waves passing along the rod-like material are reflected at the ends of the rod and reverse their direction, producing additional and generally undesirable signals. Prior designs have included many forms of non-reflecting structures such as tapered ends, clamping the ends in viscous material such as rubber and lead, and a series of stepped terminations which produce a large number of very small reflection pulses. Such schemes have not been adequate to reduce the reflected pulses to a value where they are not objectionable.

The present invention eliminates the primary reflection pulse by the use of a flat coil disposed at the end of the magnetostrictive rod. There is no reflection component when a pulse is introduced into the line by a transmitting coil and none is sensed by a receiving coil when placed in a similar position at the other end of the line. A transmitted pulse sent from one end of the line will, of course, be reflected at the other end of the line but this reflection pulse must travel twice the length of the line before being detected by the receiving coil and due to the attenuation of the line and to the long time delay for the transmission of this pulse its presence can be easily ignored or suppressed.

One of the objects of this invention is to provide an improved magnetostrictive delay line which avoids one or more of the disadvantages and limitations of prior art arrangements.

Another object of the invention is to eliminate the usual reflection wave generated by a transmitting coil in a magnetostrictive delay line.

Another object of the invention is to eliminate the reflection wave normally received by a receiving coil positioned around a magnetostrictive delay line.

Another object of the invention is to simplify the design and construction of magnetostrictive delay lines.

The invention includes a magnetostrictive delay line having a transmitting coil positioned around the end of a length of material which is subject to deformation in a magnetic field. A receiving coil may be mounted in a similar position with resultant absence of reflection pulse.

For a better understanding of the present invention, together with other and further objects thereof, reference is made to the following description taken in connection with the accompanying drawings.

Figure 1:
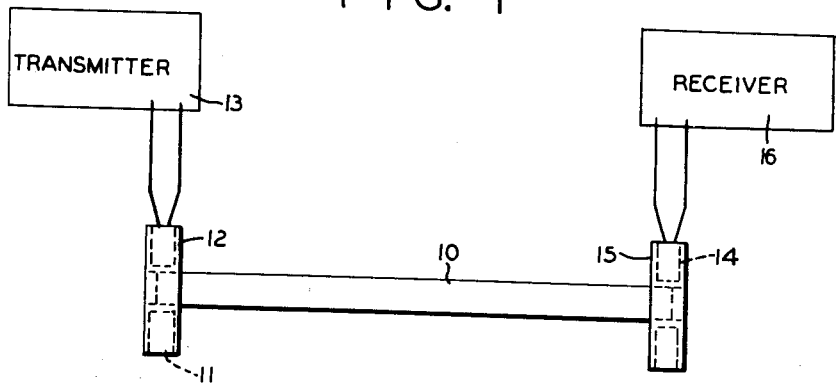
Fig. 1 is a side view of a magnetostrictive delay line showing a transmitting coil at one end of the line and a receiving coil at the other end.
Figure 2:
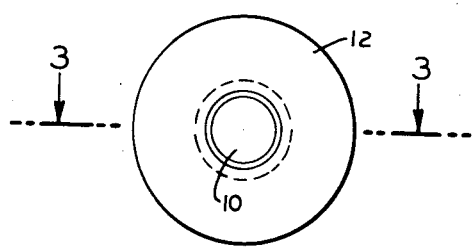
Fig. 2 is an end view of the line.
Figure 3:
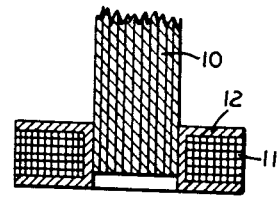
Fig. 3 is a cross sectional view of one end of the line taken along line 3—3 of Fig. 2.

Referring now to the drawings, a magnetostrictive delay line 10 includes a single bar of nickel or nickel alloy, or the bar may be subdivided into a plurality of nickel wires as indicated. At one end of the bar a winding 11 is mounted, held by a coil frame 12, the center of the coil being substantially coincident with the end of the line 10. Coil 11 is connected to a pulse circuit 13 which delivers a current pulse to the coil and thereby causes a mechanical deformation in the rod 10. At the other end of the rod 10 a receiving coil 14 is positioned, held in place by a coil frame 15, said winding being connected to a receiving amplifier 16.

When the delay line is operated, a current pulse from transmitting circuit 13 is delivered to winding 11 and a mechanical wave is generated in the end of rod 10 which travels toward the other end of the rod at the speed of sound in the material of which the rod is composed. Because of the unique positioning of the coil 11 on rod 10 only a single wave is transmitted, there being no reflection from the end of the line.

The mechanical deformation in rod 10 travels from the center of winding 11 to the center of winding 14 where it is received by the winding and a reflection started at the same time. The reception and reflection from the end of rod 10 causes a single current pulse in winding 14 which is transmitted to the receiving circuit 16.

The reflected wave from the end of the line travels back over the entire length of rod 10 and then is reflected a second time toward the end of the rod in winding 14. This will not cause any confusion because it is quite easy to eliminate the results of a pulse which has travelled so far and which is separated from the main pulse by so long a time interval.

The foregoing disclosure and drawings are merely illustrative of this invention and are not to be interpreted in a limiting sense. The only limitations are to be determined from the scope of the appended claim.

What I claim is:

A magnetostrictive delay line comprising an elongated length of material capable of mechanical deformation in a magnetic field having a selected predetermined frequency being propagated therein and having a length which is greater than a plurality of wave lengths of sound in said material at the predetermined frequency, a conductive winding positioned about one of the ends of said material and coupled to a source of electric power which generates current pulses, said winding partially overlying one end of the material so that a plane perpendicular to the axis of said winding and passing medially through said winding is substantially coincident with the plane of the end face of said delay line with a substantial portion of the winding extending beyond said end face, and a receiving winding partially overlying the other end of the length of the material for receiving the mechanical pulse and transforming it into a current pulse, so that a plane perpendicular to the axis of said receiving winding and passing medially through said receiving winding is substantially coincident with the plane of the other end face of said delay line with a substantial portion of the receiving winding extending beyond said other end face.

References Cited in the file of this patent

UNITED STATES PATENTS

| | | |
|---|---|---|
| 1,882,394 | Pierce | Oct. 11, 1932 |
| 1,962,154 | Pierce | June 12, 1934 |
| 2,063,687 | Lefrand | Dec. 8, 1936 |
| 2,501,488 | Adler | Mar. 21, 1950 |
| 2,552,139 | Bocciarelli | May 8, 1951 |
| 2,605,354 | Burns et al. | July 29, 1952 |
| 2,617,882 | Roberts | Nov. 11, 1952 |
| 2,696,590 | Roberts | Dec. 7, 1954 |
| 2,738,386 | Roberts | Mar. 13, 1956 |
| 2,815,490 | De Faymoreau | Dec. 3, 1957 |